(12) United States Patent
Birnbaum et al.

(10) Patent No.: US 11,797,337 B2
(45) Date of Patent: Oct. 24, 2023

(54) DATA PROCESSING MANAGEMENT METHODS FOR IMAGING APPLICATIONS

(71) Applicant: Leica Microsystems CMS GmbH, Wetzlar (DE)

(72) Inventors: Christopher Birnbaum, Issaquah, WA (US); Shih-Jong James Lee, Bellevue, WA (US); Tuan Phan, Lynnwood, WA (US)

(73) Assignee: Leica Microsystems CMS GmbH, Wetzlar (DE)

( * ) Notice: Subject to any disclaimer, the term of this patent is extended or adjusted under 35 U.S.C. 154(b) by 324 days.

(21) Appl. No.: 17/000,174

(22) Filed: Aug. 21, 2020

(65) Prior Publication Data
US 2022/0058052 A1    Feb. 24, 2022

(51) Int. Cl.
*G06F 9/46*     (2006.01)
*G06F 9/48*     (2006.01)
*G06F 9/30*     (2018.01)
*G06F 9/50*     (2006.01)

(52) U.S. Cl.
CPC .......... *G06F 9/4881* (2013.01); *G06F 9/3005* (2013.01); *G06F 9/5061* (2013.01)

(58) Field of Classification Search
CPC ..... G06F 9/4881; G06F 9/3005; G06F 9/5061
See application file for complete search history.

(56) References Cited

U.S. PATENT DOCUMENTS

| | | | |
|---|---|---|---|
| 2003/0151614 A1* | 8/2003 | Knee | G06T 3/0006 382/293 |
| 2008/0120626 A1* | 5/2008 | Graffagnino | G06F 40/123 719/320 |
| 2009/0254774 A1 | 10/2009 | Chamdani et al. | |
| 2011/0252312 A1* | 10/2011 | Lemonik | G06F 40/143 715/255 |
| 2016/0210263 A1 | 7/2016 | Guerin et al. | |
| 2017/0293593 A1* | 10/2017 | Cowie | G06F 3/0482 |
| 2021/0334598 A1* | 10/2021 | Tan | G06K 9/6255 |
| 2021/0373957 A1* | 12/2021 | Tovey | G06F 9/5016 |

FOREIGN PATENT DOCUMENTS

WO    2020052241 A1    3/2020

* cited by examiner

*Primary Examiner* — Bradley A Teets
(74) *Attorney, Agent, or Firm* — SPL Patentanwälte PartG mbB; Yong Beom Hwang (57) ABSTRACT

A computerized efficient data processing management method for imaging applications first performs a data flow graph generation by computing means using at least one image data and at least one requested task to generate a data flow graph. The method then applies a task execution scheduling using the data flow graph generated, a caching system configuration, the at least one image data and at least one requested task to schedule execution of the at least one requested task to generate task execution output. In addition, an adaptive data processing method performs caching system update and an optimal data processing method further performs data flow graph update.

16 Claims, 6 Drawing Sheets

DATA PROCESSING MANAGEMENT METHODS FOR IMAGING APPLICATIONS

STATEMENT AS TO RIGHTS TO INVENTIONS MADE UNDER FEDERALLY SPONSORED RESEARCH AND DEVELOPMENT

This work was supported in part by U.S. Government grant number 5R44NS097094-04, awarded by the NATIONAL INSTITUTE OF NEUROLOGICAL DISORDERS AND STROKE, 4R44MH121167-02, awarded by the NATIONAL INSTITUTE OF MENTAL HEALTH and 1U44GM136091-01, awarded by the NATIONAL INSTITUTE OF GENERAL MEDICAL SCIENCES. The U.S. Government may have certain rights in the invention.

BACKGROUND OF THE INVENTION a. Field of the Invention

Imaging applications cover a wide variety of fields such as industrial inspections, automatic manufacturing, self-driving cars, remote sensing, robotics, process automation, drug screening, scientific research, etc. For example, the images in microscopy imaging experiments might take a series of 2D to 6D (X, Y, Z, time, channel) captures with the intent to composite the view from each stage position or other configuration setup into a single n-dimensional image of the prepared sample. Each capture usually will have the same total dimensions, for example 1000×1000×1000×50×4 in XYZTC. Captures may be overlapped in subject matter space. Other imaging applications have similar data formats with increasingly higher demands of big data management.

Within each capture the samples of detector signal intensities will usually be formatted in a simple planar geometry with the channel sequence either innermost or outermost. While simple, this format presents a challenge for computerized image and data processing tool because accessing samples from one localized area requires extracting many short scan lines from the much longer total scan lines, and this can be an expensive operation. Therefore, image acquisition pipelines increasingly are incorporating a reformatting step that defines a regular grid of chunks, within which samples are ordered as if they are themselves an entire capture. This can make accessing the data more complicated, but it has the benefit that local accesses extract scan lines from less widely distributed source data, and sometimes entire chunks can be extracted at once and used as it is without further reformatting.

Another trend in image acquisition is to apply compression to each chunk of each capture, so that more data can fit into an application user's available storage. This also presents challenges to image software because compression-oblivious data traversal can cause repeated decompression of the same source data which makes access very slow. To continue with the example, a single image might consist of one hundred overlapping captures, each one totaling several hundred GB in size with four or five dimensions in one of several orderings, and internally formatted as a 10×10×10 grid of 100×100×100×50×4 chunks, with the grid and chunk dimensions also in one of several possibly independent orderings. Chunking can also result in the padding of original data, due to indivisibilities of image sides by chunk sides, which is another barrier to contiguous access.

This example is not too difficult for image processing tool to read through correctly if sufficient care is taken. However, it is difficult to do so at a high speed, especially when the render destination has a different format or scaling, such as a pyramid image level, or when the source data is compressed or requires post processing such as fusion of overlapping captures. Challenges like these become especially intractable in two scenarios that motivate this invention: (1) efficient access of n-dimensional image datasets that individually can be much larger than working memory; (2) efficient generation of derived datasets, both image and non-image. Examples include compositing for display, filtering for processing, and statistical information generation, measurement and analyses.

b. How Did Prior Art Solve Problem?

Typical software tools that support large images maintain open connections to original files, resulting in repeated access of data in files that may be compressed or slow to access for other reasons. A simple in-memory cache is typically used to reduce access times.

Typical software tools that support derived data generation will either immediately export to files similar to or the same as the original files, or they will employ a general purpose database to manage data until it can be exported, or they will keep all derived data in memory with the attendant limitations. Data generation is typically an all-or-nothing process that either blocks the entire system or is concurrent but must be completed before it can be used.

BRIEF SUMMARY OF THE INVENTION a. Objectives/Advantages of the Invention

The primary object of the invention is to reduce data processing latency through the inherent asynchrony of an explicit data flow graph, as well as through fully asynchronous entry points for all user requests. The secondary object of the invention is the increased throughput due to the parallelism applied by a scheduler to perform data flow graph traversal. The third objective of the invention is exploitation of the specialized domain of n-dimensional images, with particular benefits in the areas of unit-of-work optimization, for decreased space overhead and more predictable time overhead, based on knowledge about common external and internal data sources, including the knowledge of which exact orderings and partitioning of data traversal are more efficient than others. The fourth objective of the invention is to harmonize subsystems based on centralized knowledge of past, present, and predicted user activities, and of the total utilization of available resources. The fifth objective of the invention is the dynamic update of the application knowledge for adaptive data processing management. The sixth objective of the invention is the use of machine learning to generate and apply the application knowledge for optimal data processing management.

b. How Does this Invention Solve the Problem

The present invention provides a data processing method or system that combines the following:
A caching component optimized for large amounts of both internal and external image data, consisting of a flexible graph of cache nodes and backing stores designed to efficiently utilize heterogeneous resources, such as SSD (solid-state drive) and HDD (hard drive) combinations or networked image servers.
A data flow graph consisting of format-specific image nodes and data nodes and directed acyclic operations (functions) between them. Nodes are initially configured to match the formatting of existing data and of expected task requests. Nodes are added when image operations require endpoints. Operations are applied incrementally or in parallel as data flows between nodes according to heuristics and specific task requests, with data mediated by the caching system.

A task execution scheduling (scheduler) services application requests and administrative tasks asynchronously, and automatically parallelizes image operations by exploiting the known image formatting and the known data flow and cache topologies.

DETAILED DESCRIPTION OF THE PREFERRED EMBODIMENTS

The concepts and the preferred embodiments of the present invention will be described in detail in the following, in conjunction with the accompanying drawings.

1. Efficient Data Processing Management Method for Imaging Applications

Figure 1:
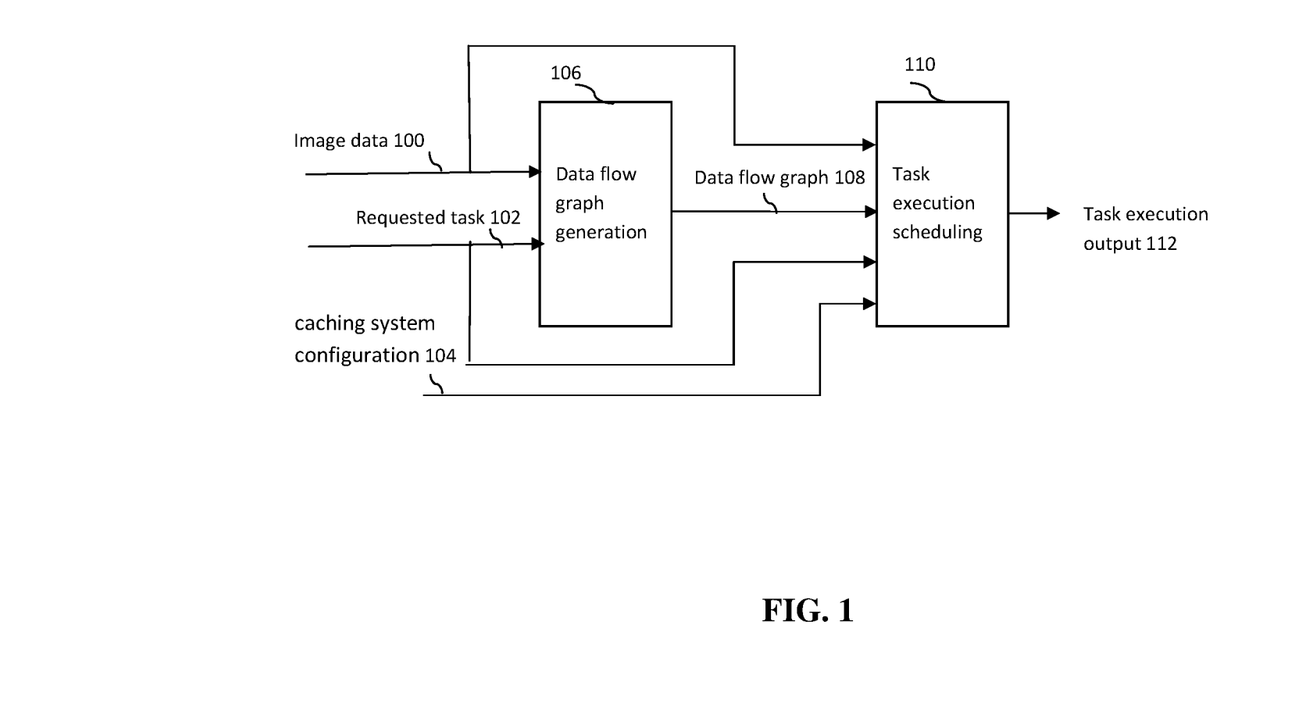
FIG. 1 shows the processing flow of the efficient data processing management method for imaging applications, according to the present invention.

FIG. 1 shows the processing flow of the efficient data processing management method for imaging applications of the current invention. A caching system configuration 104, at least one image data 100 and at least one requested task 102 are entered into electronic storage means such as computer memories, disks or networked image servers. A data flow graph generation 106 is performed by computing means using the at least one image data 100 and the at least one requested task 102 to generate a data flow graph 108. The computing means include central processing unit (CPU), graphics processing unit (GPU), digital signal processor (DSP) from local and/or cloud platforms and/or mobile devices. They can be carried out by electronics, quantum computing or optical computing devices. A task execution scheduling 110 (scheduler) is performed by computing means using the data flow graph 108, the caching system configuration 104, the at least one image data 100 and the at least one requested task 102 to schedule asynchronous execution of the at least one requested task 102 to generate at least one task execution output 112.

1.1 Caching System Configuration

Figure 2:
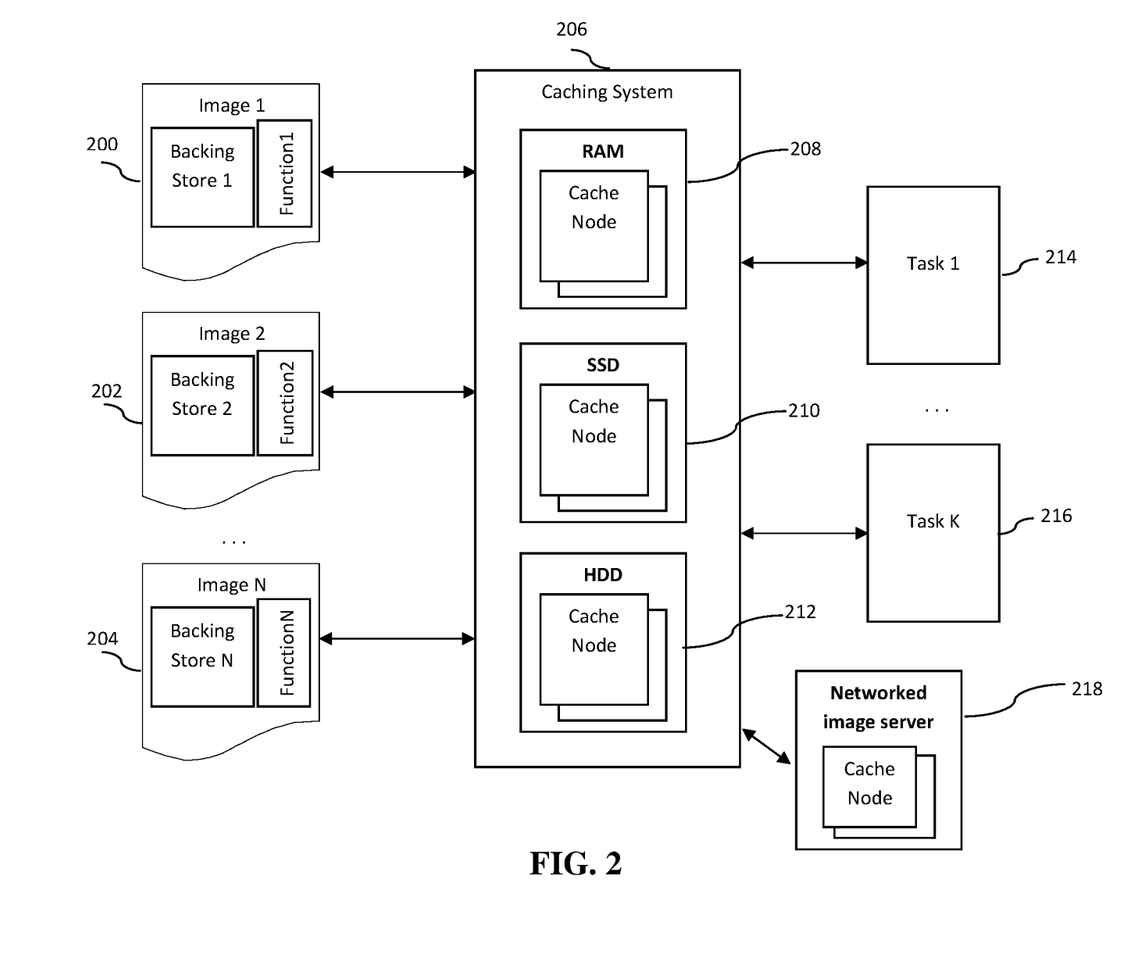
FIG. 2 shows an example caching system configuration that comprises a graph of cache nodes and backing stores, according to the present invention.

FIG. 2 shows an example caching system configuration. Given tasks 214, 216, the caching system 206 is optimized for large amounts of both internal and external image data, consisting of a flexible graph of cache nodes 208, 210, 212 and backing stores 200, 202, 204, . . . designed to efficiently utilize combinations of heterogeneous resources such as RAM cache node 208, SSD cache node 210 and HDD cache node 212 or networked image servers 218.

The caching system configuration consists of a plurality of backing stores 200, 202, 204, . . . and cache nodes 208, 210, 212. Both backing stores and cache nodes are an abstract collection of image data pages. The number of pages in the collection is limited for cache nodes but is unlimited for backing stores. The backing store and/or a function (operation) provide the data source of each image data node. As the scheduler executes tasks, a copy of each incremental batch of image data is stored in the caching system for efficient access subsequently. The caching system fills and trims each cache node as necessary to accommodate the large amounts of data that exceed the capacity of the cache nodes. The batches of data increments are allocated and distributed among the cache nodes in an optimized manner that provides consistent responsive access to the whole image data.

Multiple strategies are employed in configuring the caching system to improve its efficiency and performance, considering the characteristics of both the caching system and the image data. These include selecting the size of the increments and their ordering to best match the page size of the cache nodes and task result buffers, fitting allocations to the available memory and disk space, and predictive prefetching of data increments based on observed user access patterns, etc. The configurations can be generated by machine learning as detailed in section 2.1.

1.2 Data Flow Graph

Figure 3:
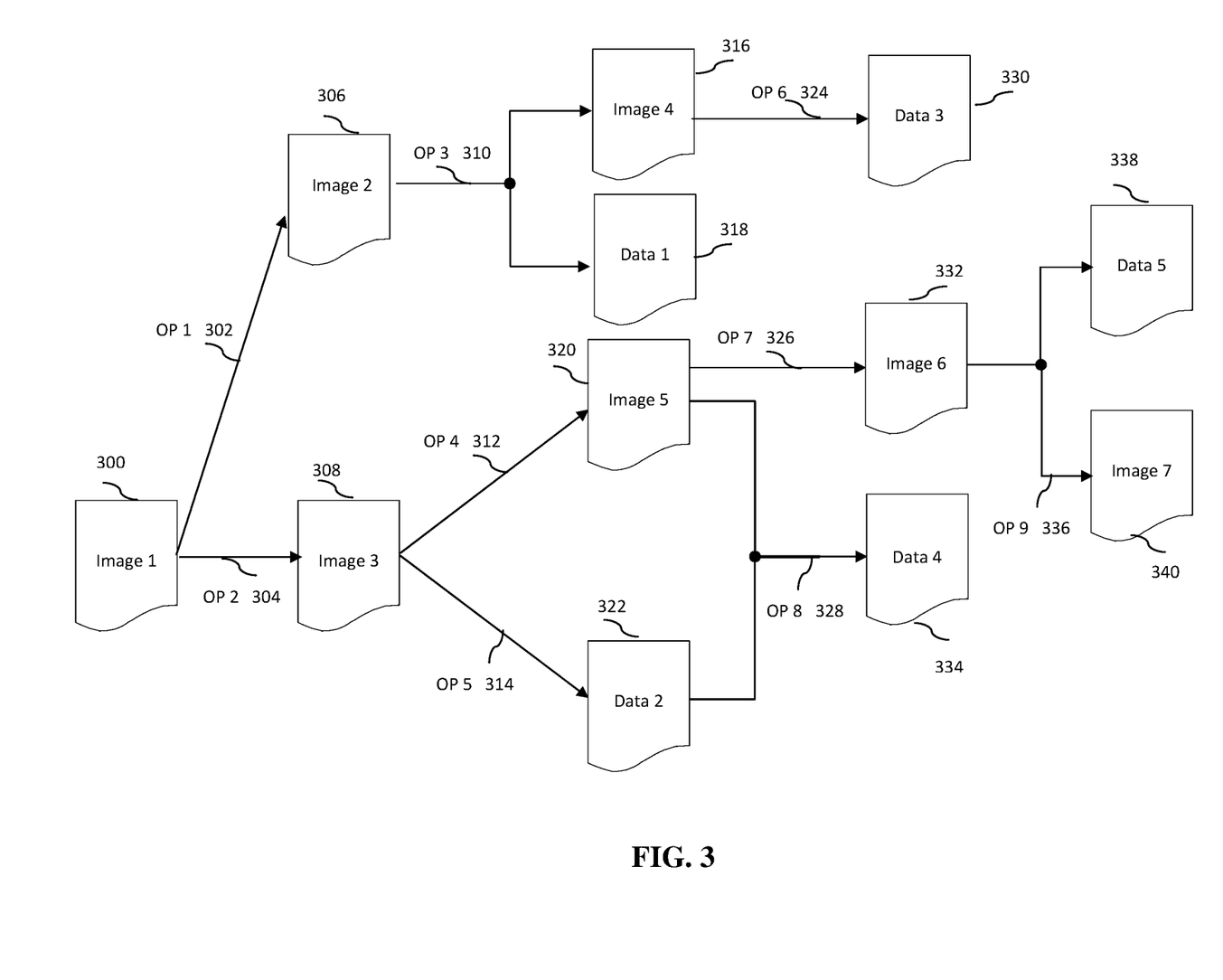
FIG. 3 shows an example data flow graph that comprises a plurality of image or data nodes and directed acyclic operations between nodes, according to the present invention.

FIG. 3 shows an example data flow graph according to the present invention. The data flow graph consists of format-specific image nodes 300, 306, 308, 316, 320, 332, 340 and data nodes 318, 322, 330, 334, 338 and directed acyclic operations (functions) 302, 304, 310, 312, 314, 324, 326, 328, 336 between them. Each operation is between two of the above-mentioned nodes. Example data include measurements, histograms, graphs, processing pipeline sequences, etc. Nodes are initially configured to match the formatting of input image data 100 and of requested task 102. Nodes are added when operations require endpoints. Operations are applied incrementally or in parallel as data flows between nodes according to heuristics and the requested task 102, with data mediated by the caching system configuration. Overwriting of a connected node is a secondary scenario but it can also be configured either to gradually disconnect downstream nodes or to push the new data through the connections to form a live subgraph.

In one embodiment of the invention, all data is passed through the system using a single abstract type that unifies access to many data sources (stack, heap, managed heap, disk) and to internal ranges of upstream parameters, which simplifies interfaces and reduces data copying. Furthermore, all data flows are annotated with intended repeatability semantics: OneTime, Limited, Backing, Immediate, etc. so that the scheduler can employ appropriate space/time tradeoffs.

1.3 Task Execution Scheduling

Figure 4:
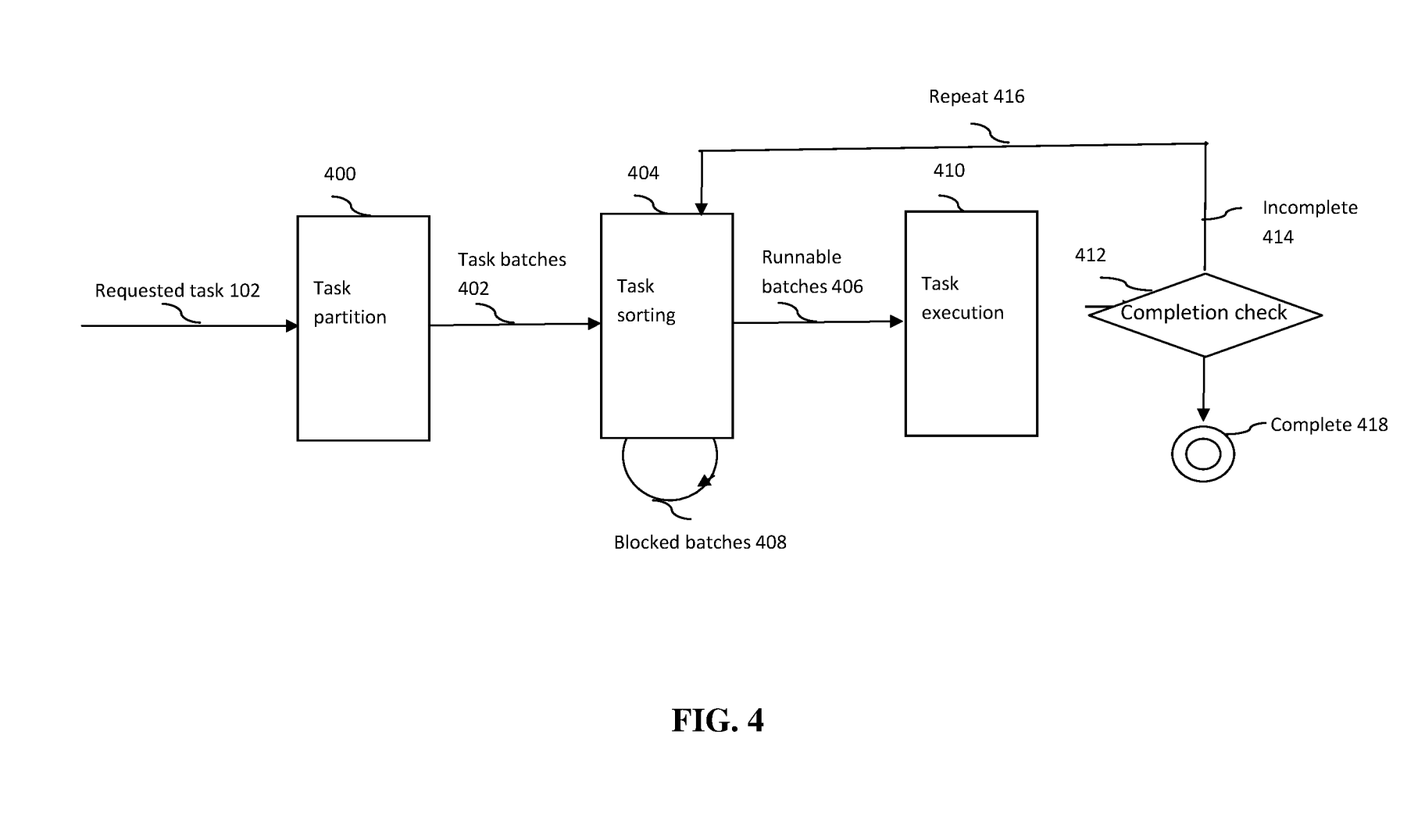
FIG. 4 shows the processing flow of the task execution scheduling method, according to the present invention.

FIG. 4 shows the processing flow of the task execution scheduling method according to the present invention. The task execution scheduling is conceptually an infinite loop that pulls requested tasks 102 from an inbox, partitions each task into parallelizable task batches 402, sorts all batches of all tasks according to what is runnable and what is blocked, then assigns batches to available execution units or frees a unit when its execution is completed, updating the bookkeeping of all batches and their parent tasks accordingly through data flow graph traversal. In one embodiment of the invention, an execution unit can be a thread, a fiber, or a networked server.

A task partition 400 is performed to divide the at least one requested task 102 into parallelizable task batches 402. A task sorting 404 is performed to sort active task batches among the task batches 402 into runnable batches 406 and blocked batches 408. The blocked batches 408 are batches whose required inputs are not all available yet. The blocking will be lifted when all inputs are ready and the blocked batches 408 are then turned into runnable batches 406. A task execution 410 is performed to assign runnable batches 406 to available execution units for execution or to free an execution unit when its execution is completed. A task completion check 412 is performed. If the completion status is complete 418, the requested task 102 is successfully completed. If the completion status is incomplete 414, the task sorting 404 and task execution 410 and completion check 412 are repeated 416 until the completion status is complete 418.

A. Task Partition

In one embodiment of the invention, the task partition and task batch generation process recognize that there are several goals when processing tasks that may come into conflict. The first is to fit batches to requested tasks. Another is to fit batches to the caching system. Finally, the batches should align with backing store data formats to prevent redundant reading or decoding at the most expensive layers of the method.

The first goal can be addressed by allowing users to define data flow nodes that exactly match their access patterns. The second goal can be addressed partly in the caching system by using fixed sized paging internally to access any-sized batch, and partly by using the caching page size as a guide when sizing batches in the scheduler. The most important goal when maximizing the efficiency of large image access is addressed by aligning all batches to the chunk structure of the underlying backing store format of individual nodes of the data flow graph.

In one embodiment of the invention, batching can be performed by a segment-aligned division of chunks that is potentially padded (when large) and/or a loose grouping of chunks (when small) fitted to a standard size target. Batches may be aligned to the chunk structure but not exactly one-to-one with respect to chunks. This is because many image files and image processing endpoints have chunk sizes that are either too small or too large to allow efficient access. When they are too small they can be grouped into a more efficient batch size, namely the chunk grid segment that is closest to the caching page size. Chunk sequences are constrained to grid segments in order to preserve the locality of batches. Note that the preserved chunking means that these batches are not contiguous buffers—each chunk must be processed separately within the scheduled batch. When chunks are too big for an efficient batch then they are split into multiple contiguous segments for each chunk, with padding of the last segment if it does not evenly divide the chunk size. This case preserves not only locality but also contiguousness between buffers. If there is padding of the last segment, it is still as contiguous as the original because it is a chunk boundary.

B. Task Sorting

In one embodiment of the invention, the task sorting involves the data flow graph traversal. If there are no connections between nodes then a given batch of a task is dependent only on the modification history of that same batch in preceding tasks, as observed by the inbox of the task execution scheduling (scheduler). If however, there are one or more data flow connections into or out of a node that a task is scheduled on, then it requires priority management.

An operation that is attached to an image node is not required to care at all about the format of its inputs and output. Operations are defined in terms of pure uninterrupted sample space. This is the only feasible approach when dealing with applications such as affine transforms, or fusion algorithms, or image hashing. And yet batching requires that operations be applied in an incremental fashion. Some operations can accommodate batching while some cannot. Operation implementations are given batch sizes by the scheduler and they reply that they are incremental on the destination side, on the source side, both, or neither. In the worst case an operation is not incremental at all, so the scheduler must wait for all possible batches of its inputs to be resolved into cache or backing stores, trigger the first intersecting task batch, and then wait for the complete image output of the function to be generated and stored away in cache or backing stores before the scheduler is notified that its batch of interest is finally available. Subsequent batches that intersect will resolve to cache or backing stores without any more operational use. Most operations can be made incremental, so parallelized batch traversal will produce significant benefits in most cases.

The way that a graph of incremental functions is traversed by the scheduler when a particular batch must be resolved is that a temporary graph within a graph is generated: the individual batches within whole images are individually linked according to the relationship between the regions of interest (ROI) and/or ranges of samples within batches on either side of each operation. When an intersecting batch is scheduled its entire source graph is also scheduled in topologically sorted order.

Source graphs are not cyclic but they may contain diamond topology. A complex data flow graph may produce a complex batch graph, however in practice most operational dependencies are resolved well before most downstream batches are scheduled, if not by prior tasks then by earlier batches of the same task, since operation outputs are saved in cache and/or backing store for the duration of intersecting tasks, if their configuration allows it. Source graphs may suffer some read amplification if operations are not very incremental or if node formats are not very compatible, but this is mitigated by the ROI and range mapping within batches, as well as the unified caching at all levels of the method.

2. Adaptive Data Processing Management Method for Imaging Applications

Figure 5:
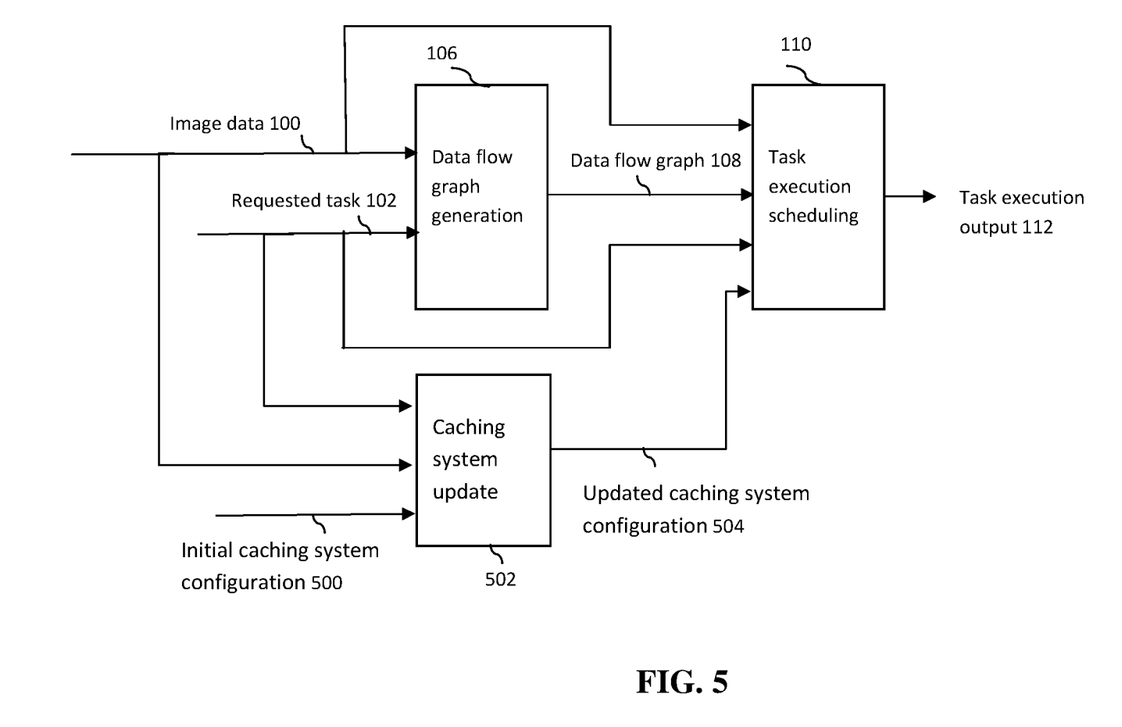
FIG. 5 shows the processing flow of the adaptive data processing management method for imaging applications, according to the present invention.

FIG. 5 shows the processing flow of the adaptive data processing management method for imaging applications of the present invention. An initial caching system configuration 500, at least one image data 100 and at least one requested task 102 are entered into electronic storage means such as computer memories. A data flow graph generation 106 is performed by computing means using the at least one image data 100 and the at least one requested task 102 to generate a data flow graph 108. A caching system update 502 is performed by computing means using the initial caching system configuration 500, the at least one image data 100 and the at least one requested task 102 to generate an updated caching system configuration 504. A task execution scheduling 110 is performed by computing means using the data flow graph 108, the updated caching system configuration 504, the at least one image data 100 and the at least one requested task 102 to schedule asynchronous execution of the at least one requested task 102 to generate at least one task execution output 112.

2.1 Caching System Update

The graph of cache nodes and backing stores in the initial caching system configuration performs global optimizations based on a model of application activities for efficient utilization of available resources. The model of application activities can be generated by machine learning using application data. The caching system update can be performed by re-learning or transfer learning of the model of application activities using the at least one image data and the at least one requested task to update the model of application activities.

In one embodiment if the invention, the application data includes the dynamic application request sequences of a variety of target application scenarios. The truth corresponding to desired caching system configurations can be determined by manual annotation or by computer optimization using efficiency metrics to find the optimal configuration during training data creation stage. The training data for relearning or transfer learning of the application model can be obtained via multiple means. The first is the acquisition of data generated during the actual usage of the non-updated caching system. In addition, data augmentation techniques can be applied to the existing data to further enrich the training data set. Furthermore, training data can be generated manually or through automatic techniques to create synthetic datasets. The caching system configuration truth and the application data can be used by machine learning methods to define the model of application for desired caching system configurations. In one embodiment of the invention, ensemble models such as random forests can be used for model learning. In another embodiment of the invention, support vector machines can be used for model learning. In yet another embodiment of the invention, deep leaning (DL) models can be used. DL models contain multiple layers of artificial neural networks such as Convolutional deep Neural Networks (CNNs), Recurrent Neural Networks (RNNs), Generative Adversarial Networks (GANs) and their variants such as Unet, UNet with residual blocks (ResUNet), deep Residual Channel Attention Networks (RCAN), UNet with densely-connected blocks (DenseUNet), Conditional Adversarial Networks (CAN), Bidirectional LSTM, Ensemble DNN/CNN/RNN, Hierarchical Convolutional Deep Maxout Network, etc.

Those skilled in the art should recognize that other machine learning/DL models could be used and they are covered by the current invention.

3. Optimal Data Processing Management Mmethod for Imaging Applications

Figure 6:
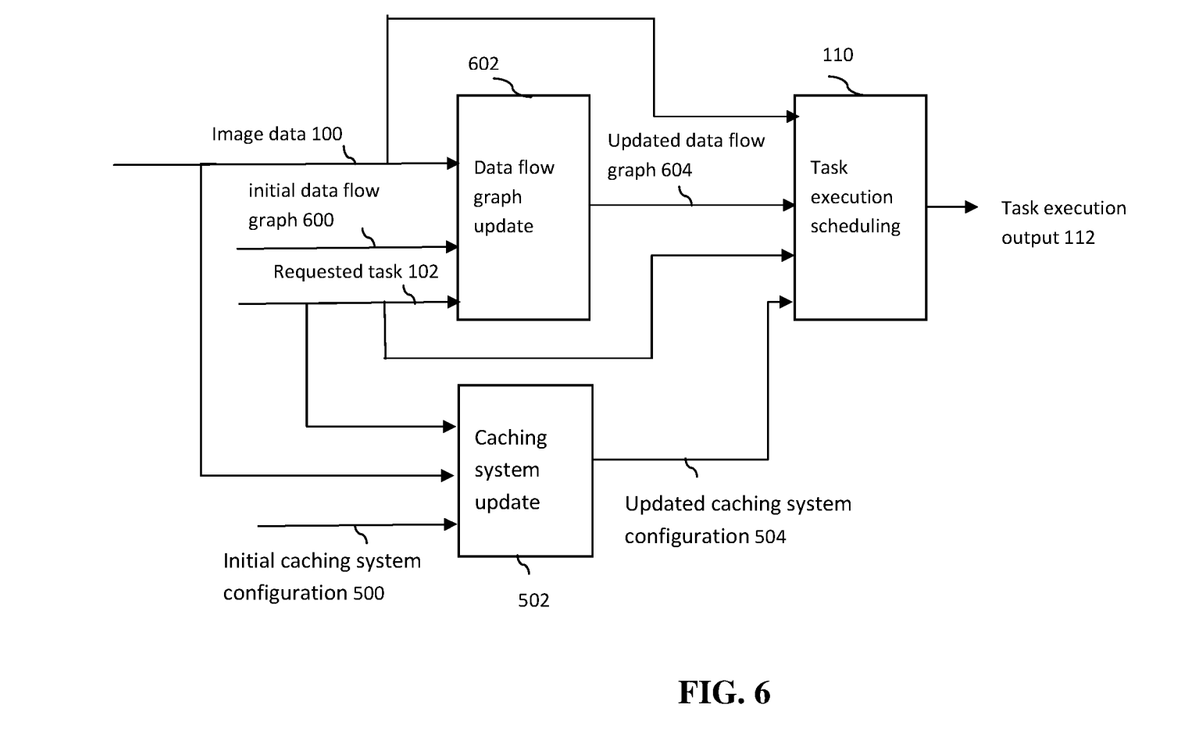
FIG. 6 shows the processing flow of the optimal data processing management method for imaging applications, according to the present invention.

FIG. 6 shows the processing flow of the optimal data processing management method for imaging applications of the current invention. An initial caching system configuration 500, an initial data flow graph 600, at least one image data 100 and at least one requested task 102 are entered into electronic storage means such as computer memories. A data flow graph update 602 is performed by computing means using the at least one image data 100, the initial data flow graph 600 and the at least one requested task 102 to generate an updated data flow graph 604. A caching system update 502 is performed by computing means using the initial caching system configuration 500, the at least one image data 100 and the at least one requested task 102 to generate an updated caching system configuration 504. A task execution scheduling 110 is performed by computing means using the updated data flow graph 604, the updated caching system configuration 504, the at least one image data 100 and the at least one requested task 102 to schedule asynchronous execution of the at least one requested task 102 to generate at least one task execution output 112. The data flow graph update 602 adds nodes and operations of the at least one image data 100 and the at least one requested task 102 to the initial data flow graph 600.

The invention has been described herein in considerable detail in order to comply with the Patent Statutes and Rules and to provide those skilled in the art with the information needed to apply the novel principles and to construct and use such specialized components as are required. However, it is to be understood that the invention can be carried out by specifically different equipment and devices, and that various modifications, both as to the equipment details, deep models and imaging and data analytics and operating procedures, can be accomplished without departing from the scope of the invention.

What is claimed is:

1. A computerized efficient data processing management method for imaging applications, the method comprising the steps of:
   a) inputting a caching system configuration, at least one image data and at least one requested task into electronic storage;
   b) performing data flow graph generation by a processor using the at least one image data and the at least one requested task to generate a data flow graph; and
   c) performing task execution scheduling using the data flow graph, the caching system configuration, the at least one image data and the at least one requested task to schedule execution of the at least one requested task to generate at least one task execution output,
   wherein the caching system configuration comprises a graph of cache nodes and backing stores,
   wherein the task execution scheduling comprises:
   d) performing a task partition to divide the at least one requested task into parallelizable task batches;
   e) performing a task sorting to sort active task batches into runnable batches and blocked batches;
   f) performing a task execution to assign the runnable batches to available execution units for execution or to free an execution unit when its execution is completed;
   g) executing the runnable batches;
   h) performing task completion check and repeating steps e) and g) if the task completion check returns an incomplete status; and
   i) repeating steps e) to h) until all task batches are executed.

2. The computerized efficient data processing management method of claim 1, wherein the data flow graph comprises a plurality of format-specific image nodes, a plurality of data nodes, and a plurality of directed acyclic operations, each between two of the nodes.

3. The computerized efficient data processing management method of claim 1, wherein the task sorting of the task execution scheduling traverses the data flow graph.

4. A computerized adaptive data processing management method for imaging applications, the method comprising the steps of:
   a) inputting an initial caching system configuration, at least one image data and at least one requested task into electronic storage;
   b) performing data flow graph generation by a processor using the at least one image data and the at least one requested task to generate a data flow graph;

c) performing caching system update by the processor using the initial caching system configuration, the at least one image data and the at least one requested task to generate an updated caching system configuration; and
d) performing task execution scheduling using the data flow graph, the updated caching system configuration, the at least one image data and the at least one requested task to schedule execution of the at least one requested task to generate at least one task execution output,
e) executing the at least one requested task,
wherein the initial caching system configuration comprises a graph of cache nodes and backing stores,
wherein the graph of cache nodes and backing stores of the initial caching system configuration performs harmonization of diverse subsystems based on a model of application activities,
wherein the caching system update uses the at least one image data and the at least one requested task to update the model of application activities.

5. The computerized adaptive data processing management method of claim 4, wherein the data flow graph comprises a plurality of format-specific image nodes, a plurality of data nodes, and a plurality of directed acyclic operations, each between two of the nodes.

6. The computerized adaptive data processing management method of claim 4, wherein the model of application activities is generated by machine learning using application data.

7. The computerized adaptive data processing management method of claim 4, wherein the task execution scheduling comprises the steps of:
a) performing a task partition to divide the at least one requested task into parallelizable task batches;
b) performing a task sorting to sort active task batches into runnable batches and blocked batches;
c) performing a task execution to assign the runnable batches to available execution units for execution or to free an execution unit when its execution is completed;
d) performing task completion check and repeating steps b) and c) if the task completion check returns an incomplete status; and
e) repeating steps b) to d) until all task batches are executed.

8. The computerized adaptive data processing management method of claim 7, wherein the task sorting of the task execution scheduling traverses the data flow graph.

9. A computerized optimal data processing management method for imaging applications, the method comprising the steps of:
a) inputting an initial caching system configuration, an initial data flow graph, at least one image data and at least one requested task into electronic storage;
b) performing data flow graph update by a processor using the initial data flow graph, the at least one image data and the at least one requested task to generate an updated data flow graph;
c) performing caching system update by the processor using the initial caching system configuration, the at least one image data and the at least one requested task to generate an updated caching system configuration; and
d) performing task execution scheduling using the updated data flow graph, the updated caching system configuration, the at least one image data and the at least one requested task to schedule execution of the at least one requested task to generate at least one task execution output,
e) executing the at least one requested task,
wherein the initial caching system configuration comprises a graph of cache nodes and backing stores,
wherein the initial data flow graph comprises a plurality of format-specific image nodes, a plurality of data nodes, and a plurality of directed acyclic operations, each between two of the nodes,
wherein the data flow graph update adds nodes and operations of the at least one image data and the at least one requested task to the initial data flow graph.

10. The computerized optimal data processing management method of claim 9, wherein the plurality of format-specific image nodes and the plurality of data nodes are initially configured to match existing data and expected tasks.

11. The computerized optimal data processing management method of claim 9, wherein the graph of cache nodes and backing stores of the initial caching system configuration performs harmonization of diverse subsystems based on model of application activities.

12. The computerized optimal data processing management method of claim 11, wherein the model of application activities is generated by machine learning using application data.

13. The computerized optimal data processing management method of claim 11, wherein the caching system update uses the at least one image data and the at least one requested task to update the model of application activities.

14. The computerized adaptive data processing management method of claim 9, wherein the task execution scheduling comprises the steps of:
a) performing a task partition to divide the at least one requested task into parallelizable task batches;
b) performing a task sorting to sort active task batches into runnable batches and blocked batches;
c) performing a task execution to assign the runnable batches to available execution units for execution or to free an execution unit when its execution is completed;
d) performing task completion check and repeating steps b) and c) if the task completion check returns an incomplete status; and
e) repeating steps b) to d) until all task batches are executed.

15. The computerized optimal data processing management method of claim 14, wherein the task sorting of the task execution scheduling traverses the data flow graph.

16. An imaging device comprising:
circuitry configured to:
a) input a caching system configuration, at least one image data, and at least one requested task into electronic storage;
b) perform data flow graph generation using the at least one image data and the at least one requested task to generate a data flow graph; and
c) perform task execution scheduling using the data flow graph, the caching system configuration, the at least one image data, and the at least one requested task to schedule execution of the at least one requested task to generate at least one task execution output,
wherein the caching system configuration comprises a graph of cache nodes and backing stores,
wherein, to perform the task execution scheduling, the circuitry is configured to:

d) perform a task partition to divide the at least one requested task into parallelizable task batches;
e) perform a task sorting to sort active task batches into runnable batches and blocked batches;
f) perform a task execution to assign the runnable batches to available execution units for execution or to free an execution unit when its execution is corn pleted;
q) execute the runnable batches;
h) perform task completion check and repeat steps e) and q) if the task completion check returns an incomplete status; and
j) repeat steps e) to h) until all task batches are executed.

\* \* \* \* \*